United States Patent Office 3,565,889
Patented Feb. 23, 1971

3,565,889
**DERIVATIVES OF DIBENZO[b,e][1,4]
DIAZEPIN-11(10)-ONE**
Hiroshi Kugita, Tokyo-to, Mikio Takeda, Toda-shi, and Mitsuru Matsubara, Oomiya-shi, Japan, assignors to Tanabe Seiyaku Co., Ltd., Osaka, Japan, a corporation of Japan
No Drawing. Filed Mar. 14, 1968, Ser. No. 712,924
Claims priority, application Japan, Mar. 20, 1967, 42/17,530
Int. Cl. C07d 53/02
U.S. Cl. 260—239.3          4 Claims

ABSTRACT OF THE DISCLOSURE

Novel 8-alkylsulfonyl derivatives of 5-methyl-10-(ω-dialkylaminoalkyl)-5H-dibenzo[b,e][1,4]diazepin - 11(10)-one represented by the formula:

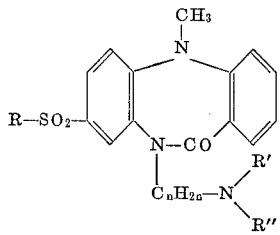

wherein R, R' and R" are lower alkyl and $n$ is 2 or 3, which are useful as antidepressant having low toxicity, prepared by the reaction of the corresponding 10-unsubstituted-dibenzodiazepin-11(10)-one compounds with an ω-dialkylaminoalkyl halide.

---

This invention relates to novel derivatives of dibenzo[b,e][1,4]diazepin-11(10)-one and the process for preparing the same. More particularly, it relates to a process for preparing 5-methyl - 8 - alkylsulfonyl-10-(ω-dialkylaminoalkyl)-5H-dibenzo[b,e][1,4]diazepin - 11(10) - one represented by the formula:

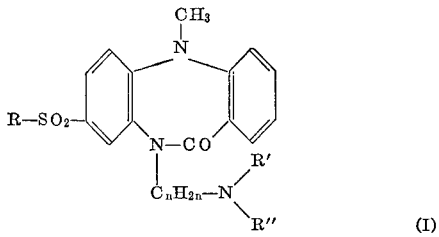

wherein R, R' and R" are lower alkyl groups and $n$ is 2 or 3, and pharmaceutically acceptable acid addition salts thereof.

Many antidepressants have been utilized for clinical use. But some of them, for example, imipramine and amitriptyline are known as having its disadvantages of side effects due to their anticholinergic action. We have found a series of novel antidepressive compounds which they do not belong to either sympathomimetic amine or MAO inhibitor. Novel compounds of the present invention, which do not show any tranquilizer action, have stronger adrenergic action as compared with those of known compounds. Furthermore, it is one of the important characteristics that they have much weaker anticholinergic action.

Recently, there had been reported that dibenzepine [chemical name: 5-methyl-10-(2-dimethylaminoethyl)-5H-dibenzo[b,e][1,4]diazepin - 11(10) - one hydrochloride] and its related compounds have therapeutically useful properties such as antihistamine, analgesic parasympatholytic or antidepressive action. (C.f. Netherland Pat. No. 256053 (1966), Therapie, 21 (3), 773–780 (1966) Fr.)

However, we have found that the above novel 8-alkylsulfonyl-substituted derivatives [I] have the more purified antidepressive action and are substantially free from side effects caused by anticholinergic action such as for example dry-mouth, thirst, fatigue, dizziness, headache, and tremor. Moreover, the derivatives of the present invention are also free from side effects caused by MAO-inhibiting action such as, for example hepatosis. Furthermore, they have a remarkably low toxicity, while the antidepressive action of the derivatives are approximately on the same level as those of 8-unsubstituted-dibenzo-[b,e][1,4]diazepin-11(10)-one compounds.

For example, 5-methyl - 8 - ethylsulfonyl-10-(2-dimethylaminoethyl) - 5H - dibenzo[b,e][1,4]diazepin-11(10)-one (hereinafter designated as "SM-8") antagonized hypotermia, ptosis and gastric hemorrhage produced by reserpine as effectively as or slightly more effectively than dibenzepine. The occurrence of ptosis in mice which were injected with 2.5 mg./kg. of reserpine (intravenously) was effectively prevented by administering "SM-8" as shown in Table 1.

TABLE 1
Preventive effect against ptosis (number of ptosis mice/number of mice tested)

| Compound administered | Dose mg./kg.) | Time after administration (hrs.) | | |
|---|---|---|---|---|
| | | 1 | 2 | 3 |
| SM-8 | 50 | 0/5 | 0/5 | 4/5 |
| | 25 | 0/5 | 3/5 | 5/5 |
| | 12.5 | 0/5 | 4/5 | 5/5 |
| | 6.25 | 0/5 | 4/5 | 5/5 |
| Dibenzepine | 50 | 0/5 | 4/5 | 5/5 |
| | 25 | 1/5 | 5/5 | 5/5 |
| | 12.5 | 0/5 | 4/5 | 5/5 |
| | 6.25 | 1/5 | 5/5 | 5/5 |
| None | | 3/5 | 5/5 | 5/5 |

On the other hand, "SM-8" showed a remarkably low toxicity as described in Table 2. Furthermore, the toxicosis produced by "SM-8" was not found to be serious.

TABLE 2
Acute toxicity ($LD_{50}$ on mice (mg./kg.))

| Compounds | Route | | |
|---|---|---|---|
| | Intravenous | Intraperitoneal | Oral |
| SM-8 | 73.9 | 353.3 | 857.4 |
| Dibenzepine | 31.2 | 70.2 | 214.4 |
| Imipramine | 35 | 115 | 400 |

MAO-inhibiting action of "SM-8" was estimated as much weaker than nialmide. Moreover, "SM-8" showed much lower anticholinergic, antihistamine and antiserotonin activity as compared with dibenzepine, imipramine or amitriptyline.

According to the present invention, the 8-alkylsulfonyl derivatives of 5 - methyl - dibenzo[b,e][1,4]diazepin-11(10)-one [I] can be prepared by reacting 5-methyl-8-alkylsulfonyl - 5H - dibenzo[b,e][1,4]diazepin-11(10)-one represented by the formula:

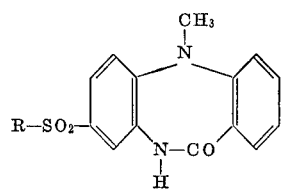
(II)

wherein R has the same meaning as stated above, with an ω-dialkylaminoalkyl halide represented by the formula:

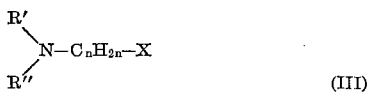 (III)

wherein R', R" and n have the same meaning as stated above and X is a halogen atom.

The alkyl groups R, R' and R" may be methyl, ethyl, propyl groups, etc. Preferable examples of the compound (III) are 2-dimethylaminoethyl chloride and 3-dimethylaminopropyl chloride.

In a preferable embodiment of the present invention, the starting 10-unsubstituted-dibenzodiazepin-11(10)-one compound (II) is reacted with an alkali metal salt. For this purpose, the compound (II) may be treated with an alkali metal such as sodium, potassium or lithium, or their amides or hydrides. The treatment may be carried out in the solvent such as toluene, xylene, dioxane, etc., usually under heating, and then the resultant metal salt of the compound (II) is reacted with ω-dialkylaminoalkyl halide (III). The condensation reaction of the resultant alkali salt of the starting 10-unsubstituted-dibenzodiazepin-11-(10)-one compound (II) with ω-dialkylaminoalkyl halide (III) is preferably carried out by heating a solution or a suspension containing both compounds for from about 3 to 5 hours.

After the reaction, the product (I) can be isolated from the reaction mixture by a conventional manner, for example, by evaporating the mixture to remove solvent, washing away water-soluble inorganic substances from the residue and extracting the basic substance from the residue with an organic solvent such as benzene. It is preferable to isolate the compound (I) in the form of a stable acid addition salt such as the hydrochloride, hydrobromide, hydrosulfate, succinate, citrate.

The starting 10-unsubstituted-dibenzodiazepin - 11(10)-one compounds (II) are also novel compounds. The compounds (II) can be prepared, for example, by reacting an alkyl 3-nitro-4-chlorophenyl-sulfone with N-methylanthranilic acid in the presence of an acid acceptor such as alkali carbonate and a condensation catalyst such as powdered copper, catalytically reducing the resulting 2-(2-nitro - 4 - alkyl-sulfonyl-phenylamino)-benzoic acid in the presence of Raney-nickel and heating the resultant amine compound with an acid to form a diazepine nuclei.

EXAMPLE I 3 g. of 5-methyl - 8 - ethylsulfonyl-5H-dibenzo[b,e]-[1,4]diazepin-11(10)-one were dissolved in 80 ml. of dioxane under moderate heating. 0.57 g. of sodium amide was added to the solution with stirring and the mixture was refluxed for 3 hours. After cooling to about 35° C., 1.02 g. of 2-dimethylaminoethyl chloride were added to the reaction mixture and the mixture was refluxed for 3 hours. Then, the mixture was evaporated under reduced pressure to remove solvent and the residue was extracted with benzene. The resulting benzene solution was washed with water and extracted with 10% aqueous hydrochloric acid. The extract was neutralized with 10% aqueous solution of sodium hydroxide and extracted with benzene. The benzene solution was washed with water, dried and evaporated to remove benzene, whereby 3.5 g. of 5-methyl - 8 - ethylsulfonyl - 10 - (2-dimethylaminoethyl)-5H-dibenzo[b,e][1,4]diazepin-11(10)-one were obtained as crystals. The crystals were recrystallized from benzene. M.P. 133–136° C. Yield: 3.0 g. (81.7% of theory).

The recrystallized crystals were dissolved in a mixture of 40 ml. of acetone and 12 ml. of ether and a methanol solution of hydrochloric acid were added to the solution, whereby 3.0 g. of 5-methyl - 8 - ethylsulfonyl-10-(2-dimethylaminoethyl) - 5H - dibenzo-[b,e][1,4]diazepin-11-(10)-one hydrochloride were obtained. M.P. 216–218° C.

After recrystallization from ethanol, M.P. 217–219° C. Yield: 2.8 g.

EXAMPLE 2

3 g. of 5-methyl - 8 - ethylsulfonyl-5H-dibenzo[b,e]-[1,4]diazepin 11(10)-one were dissolved in 80 ml. of dioxane. 0.57 g. of sodium amide was added to the solution and the mixture was refluxed for 3 hours. After cooling, 1.16 g. of 3-dimethylaminopropyl chloride were added to the reaction mixture and the mixture was treated as described in Example 1, whereby crystals of 5-methyl-8-ethylsulfonyl-10-(3-dimethylaminopropyl) - 5H - dibenzo-[b,e][1,4]diazepin-11(10)-one hydrochloride were obtained. The crystals were recrystallized from ethanol. M.P. 231–232° C. Yield: 3.2 g.

What we claim is:

1. 5-methyl - 8 - ethylsulfonyl - 10 - (2-dimethylaminoethyl) - 5H - dibenzo[b,e][1,4]diazepine-11(10)-one or a pharmaceutically acceptable acid addition salt thereof.
2. The compound as in claim 1 wherein said acid addition salt is the hydrochloride.
3. The compound as in claim 2 wherein said hydrohalide is the hydrochloride.
4. The compound as in claim 1 wherein said compound is 5-methyl - 8 - ethylsulfonyl - 10 - (2-dimethylaminoethyl) - 5H - dibenzo[b,e][1,4]diazepine-11(10)-one.

References Cited

UNITED STATES PATENTS

| | | | |
|---|---|---|---|
| 3,419,547 | 12/1968 | Schmutz et al. | 260—239.3 |
| 3,442,946 | 5/1969 | Keller et al. | 260—566 |
| 3,445,458 | 5/1969 | Bell | 260—239.3 |
| 3,464,977 | 9/1969 | Renz et al. | 260—239.3 |

NORMA S. MILESTONE, Primary Examiner

R. T. BOND, Assistant Examiner

U.S. Cl. X.R.

424—244